UNITED STATES PATENT OFFICE.

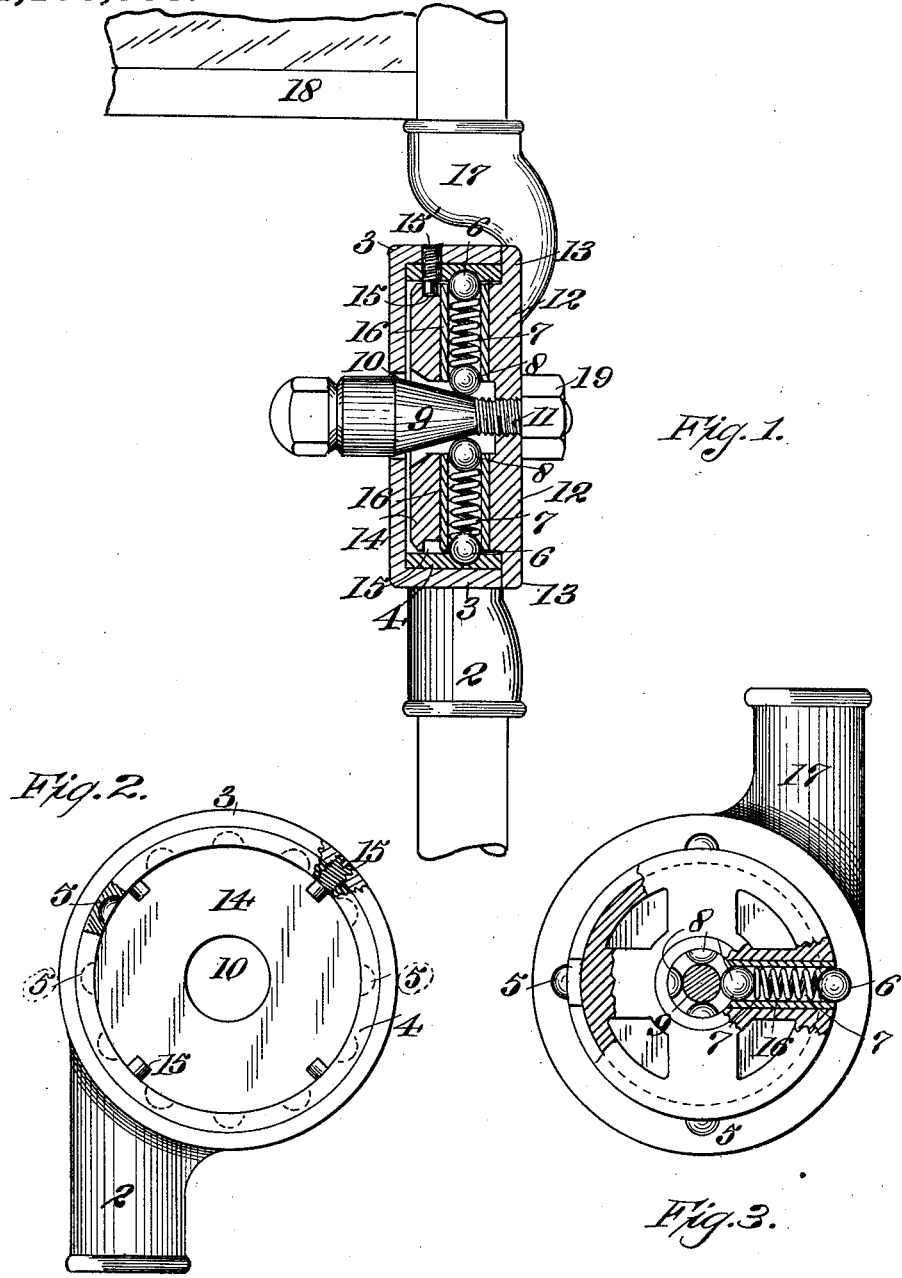

CHARLES I. WRIGHT, OF OAKLAND, CALIFORNIA.

WIND-SHIELD HINGE.

1,100,338.

Specification of Letters Patent. Patented June 16, 1914.

Application filed March 25, 1913. Serial No. 756,659.

*To all whom it may concern:*

Be it known that I, CHARLES I. WRIGHT, a citizen of the United States, residing at Oakland, in the county of Alameda and State of California, have invented new and useful Improvements in Wind - Shield Hinges, of which the following is a specification.

This invention relates to improvements in hinges for automobile shields.

The object of the present invention is to provide a readily adjustable, dependable hinge structure whereby the wind shield of an automobile may be angularly adjusted to any desired position with relation to a fixed portion of the automobile.

The invention consists of a stationary member and a complementary male member fitted in the stationary member, and means interposed between the stationary and the male member, whereby the latter may be adjusted at diverse angles and substantially readjusted as desired.

Figure 1 is a central vertical section through the hinge. Fig. 2 is a face view of the concaved side of the stationary socket. Fig. 3 is a side elevation partly broken away of the male member of the hinge.

In its illustrated embodiment, my hinge comprises a socket member 2 adapted to be fixedly attached to an automobile, and which has a cylindrical shell portion 3 of suitable thickness, the cavity of which is adapted to receive a stationary ball retainer ring 4, the internal surface of which is provided with a plurality of hemispherical seats 5 into each of which is projected a ball 6, normally being thrust outwardly by the expansion of respective springs 7; the inner ends of the springs reacting also upon the balls 8 which are supported upon a tapering bolt 9, which may be inserted through an aperture 10 formed for its reception in the closed side of the shell 3. The opposite end of the adjusting device or bolt 9 is threaded as at 11, to be screwed into the side or body of a male member 12 which has a flanged peripheral edge 13, adapted to bear upon the adjacent edge of the shell 3.

The member 12 has a cylindrical extension 14 telescoping with the lining 4 of the female or socket member 3. Adjacent the edge of the extension 14 is formed an annular groove 15 to receive the locking pins 15'. Extension 14 of member 12 is also provided with a plurality of radially arranged bushings 16, in which are mounted the balls 6 and 8, and between the balls are arranged the expansile springs 7, the functions of which are to thrust the balls oppositely the inner series as 8, bearing upon the conical surface of the bolt 9 and the outer surface of the ball 6, being adapted for engagement with the ball seats 5 in the stationary ring 4 of the shell. These balls 6—8 act as spring-pressed pawls or plungers to lock the shield in any desired position.

After the several parts have been arranged as before described, the degree of pressure with which the balls 6 are forced upon the seats 5 may be nicely determined by the longitudinal adjustment of the tapering bolt 9 which is screw threaded in the turnable hinge disk 12; this being provided with an extending connection 17 to which may be connected the wind shield, a fragment of which is shown at 18.

When the wind shield 18 is to be adjusted at any desired angle with relation to the stationary member 2 of the hinge, the wind shield 18 is grasped and sufficient force is applied to swing it about the axis 9, the force causing the outer series of balls 6 to move inwardly sufficient to unseat them from the pockets 5, compressing the springs 7, the balls may then travel over the concentric surface between the annularly spaced ball seats 5.

When it is desired to increase the degree of pressure of the locking balls 6 upon their seats 5, the bolt 9 may be advanced or screwed farther into the hinge disk 12, the tapering portion of the bolt 9 thus spreading the inner series of balls 8, thus increasing the compression of the springs 7, which latter will consequently exert greater reaction upon the locking balls 6.

When the tension of the springs 7 has been adjusted to the requisite degree sufficient to sustain the wind shield 18 in any of its several positions, the bolt 9 may be locked against turning by means of a lock nut 19 on the outer end of the bolt, which may be turned to binding engagement with the turnable hinge disk 12.

From the foregoing it will be observed that I have provided a hinge for automobile shields of simple, substantial construction, readily adjustable to position the shield at the desired angle with relation to the vehicle, and that the shield may be angularly adjusted by applying sufficient force to turn it about the axis of the part 9, so that the locking balls 6 will be angularly shifted from one set of seats 5 to another set corresponding with the angular position of the shield 18; and manifestly as many of the locking balls 6 with their respective springs 7 as may be desired, may be provided.

The screws 15' besides keeping the parts 3—12 in place, also serve to hold the ring 4 against rotation; the ring 4 and socket 3 being considered as made in one piece although for obvious reasons of mechanical construction they are made in two parts and then assembled. Likewise bushings 16 for the male member 14 are separately insertible into radial perforations in member 14.

Having thus described my invention, what I claim and desire to secure by Letters Patent, is—

1. The combination in a hinge of a disk, a series of radially disposed bushings in said disk, a groove around the disk, a cylindrical shell into which the disk fits, a ring in said shell provided with a series of angularly arranged spaced seats, a pair of balls in each of said bushings, an expansion spring for normally forcing one of the balls of each pair into frictional engagement with the seats, adjustable means loosely inserted through the shell for varying the pressure exerted by the balls, and means coacting with the shell and the groove in the disk for locking the parts together.

2. A hinge comprising a cylindrical shell, a series of angularly arranged spaced seats on the inner periphery of said shell, a disk inserted in the shell, a circumferentially formed groove in the disk, a series of radially disposed bushings in said disk, spring pressed balls in said bushings, a pin carried by the shell to coact with the groove in the disk, adjustable means loosely projecting through an opening in the shell for varying the pressure exerted by the balls, said means having threaded engagement with the disk, and means for locking said adjustable means in position.

In testimony whereof I have hereunto set my hand in the presence of two subscribing witnesses.

CHARLES I. WRIGHT.

Witnesses:
  H. P. COOPER,
  HENRY PHILLIPS.

---

Copies of this patent may be obtained for five cents each, by addressing the "Commissioner of Patents, Washington, D. C."